United States Patent [19]

Forney

[11] Patent Number: 4,726,272
[45] Date of Patent: Feb. 23, 1988

[54] ASEPTIC TUBER CUTTER

[76] Inventor: Jack Forney, 1825 W. Vine Dr., Fort Collins, Colo. 80521

[21] Appl. No.: 904,465

[22] Filed: Sep. 8, 1986

[51] Int. Cl.⁴ .......................... B26D 1/03; B26D 7/10
[52] U.S. Cl. ........................................ 83/168; 83/171; 83/857
[58] Field of Search .................... 83/16, 171, 168, 857

[56] References Cited

U.S. PATENT DOCUMENTS

| | | |
|---|---|---|
| 1,227,056 | 5/1917 | King . |
| 1,273,039 | 7/1918 | Cuddigan . |
| 1,278,356 | 9/1918 | Komrosky . |
| 1,383,970 | 7/1921 | Bentley . |
| 2,023,323 | 12/1935 | Herrick . |
| 2,479,982 | 8/1949 | Stevens ............................ 83/857 X |
| 2,487,719 | 11/1949 | Meyer ............................... 83/168 X |
| 3,627,983 | 12/1971 | Pickering ......................... 83/168 X |
| 3,662,151 | 5/1972 | Haffey .............................. 83/171 X |
| 3,877,625 | 4/1975 | Brock ............................... 83/171 X |

OTHER PUBLICATIONS

Forney Aseptic Seed Cutter, Forney Industries, Inc., Model #341.

Primary Examiner—Frank T. Yost
Attorney, Agent, or Firm—Hugh H. Drake

[57] ABSTRACT

A tuber to be cut for reproduction purposes is supported on a carrier and moved toward a knife blade assembly that cuts the tuber. Throughout operation, the blade is maintained at a temperature sufficiently elevated to destroy pathogens. That temperature level is further elevated during cutting to an amount sufficient to cauterize the tuber surface, offset cooling of the blade by reasons of moisture in the tuber and to clear the blade of tissue residue from the tuber. Further included are means selectively operatable to elevate the temperature of the carrier to a level sufficient to sanitize the carrier.

9 Claims, 6 Drawing Figures

ASEPTIC TUBER CUTTER

The present invention relates to aseptic tuber cutters. More particularly, it pertains to a cutter apparatus for enabling the production of seed pieces from certified seed potatoes, with particular attention to sanitization and to the destruction of pathogens which are commonly transmitted during seed cutting operations.

Apparatus has long been known for cutting or segmenting whole seed potato tubers in order to produce what are commonly known as seed pieces. In a horticultural sense, the seed pieces are not true seeds. They are potato tuber propagates. Representative prior machines are shown in U.S. Pat. Nos. 1,227,056, 1,273,039, 1,278,356, 1,383,970, 2,023,323.

Today, there are a number of different such machines on the market, typically employing knives of various shapes for cutting whole potatoes into what usually are between two and six parts. Thus, a potato grower will either save a portion of his crop each year for use as seed potatoes or will purchase those from other growers who specialize in growing and marketing seed potatoes.

Suitable apparatus requires careful consideration and design, so as to avoid bruising the potatoes being handled. Typically, the seed pieces weigh approximately two ounces. An individual grower may plant approximately six acres per day, using twenty sacks per acre. That translates to over 38,000 seed pieces needed per day of planting. Accordingly, from a nationwide standpoint, the production of certified seed potatoes is an enormous business.

An ever incipient problem is the spread of various diseases throughout a crop or even throughout a region where there are numerous potato growers. Such diseases take the form of a variety of pathogens involving one or more of bacteria, fungi and viruses. In recognition of this problem, a number of methods of sterilization of knives have been employed, such as the use of a high-pressure autoclave, dipping or spraying of the knives with chemical disinfectants or heating the knives in a flame. Such procedures tend to be slow, of questionable value and uneconomical. Variations occur because of the human element involved in determining time, duration of exposure, temperatures and other such actions. Moreover, a possibility presents itself with regard to the efficacy or the toxic effect of chemicals to the cut surface of the seed pieces.

It is a general object of the present invention to provide a new and improved aseptic tuber cutter which avoids or at least minimizes such difficulties in prior approaches.

Another object of the present invention is to provide a new and improved cutter which results in the enhancement of development of a suitable protective suberized layer on the cut surfaces of the seed pieces.

An overall objective of the present invention is to provide cutter apparatus which is reasonably economical of operation as well as initial cost and, particularly, which eliminates the transmission of potential pathogens by the cutting knives.

Still another object of the present invention is to provide a tuber cutter which overcomes a problem of a tendency of tissue residue, such as starch, to accumulate on the blades.

To aid in the preservation of the seed potatoes as well as to increase protection against the transmission of disease, the seed piece ideally is caused to develop a protective layer, almost like a thin skin. One method of enabling the formation of such a layer in human tissue is that long known as cauterization. In earlier times, that often was done by the application of a heated blade to the tissue surface. More recently, a hot wire surgical cautery has been developed which purports to have an advantage of burning off debris clinging to its tip by increasing temperature of the hot wire by the conducting of electrical current through the wire. One example may be found in U.S. Pat. No. 3,662,151.

It is a still further object of the present invention to provide a new and improved tuber cutter which takes advantage of the use of an electrical current for the cleaning of tissue residue from the cutting elements.

In accordance with one embodiment of the present invention, an aseptic tuber cutter includes a carrier that supports a tuber which is to be cut. An associated assembly includes a knife blade for cutting the tuber. The apparatus includes means for moving the carrier relatively toward the assembly. The knife blade is maintained throughout operation at a temperature sufficiently elevated to destroy pathogens. In addition, the apparatus includes means for further elevating that temperature during cutting of the tuber by the blade to a level sufficient to offset cooling of the blade by reason of moisture in the tuber and to clear the blade of tissue residue. Preferably, the apparatus further includes means selectively operable to elevate the temperature of the carrier to a level sufficient to sanitize the same.

The foregoing and other objects of the present invention and the manner of operation will best be understood by reference to the following specification which includes a detailed description of one or more specific embodiments thereof in association with the accompanying drawings in the several figures of which like reference numerals designate like parts and in which.

Figure 1:
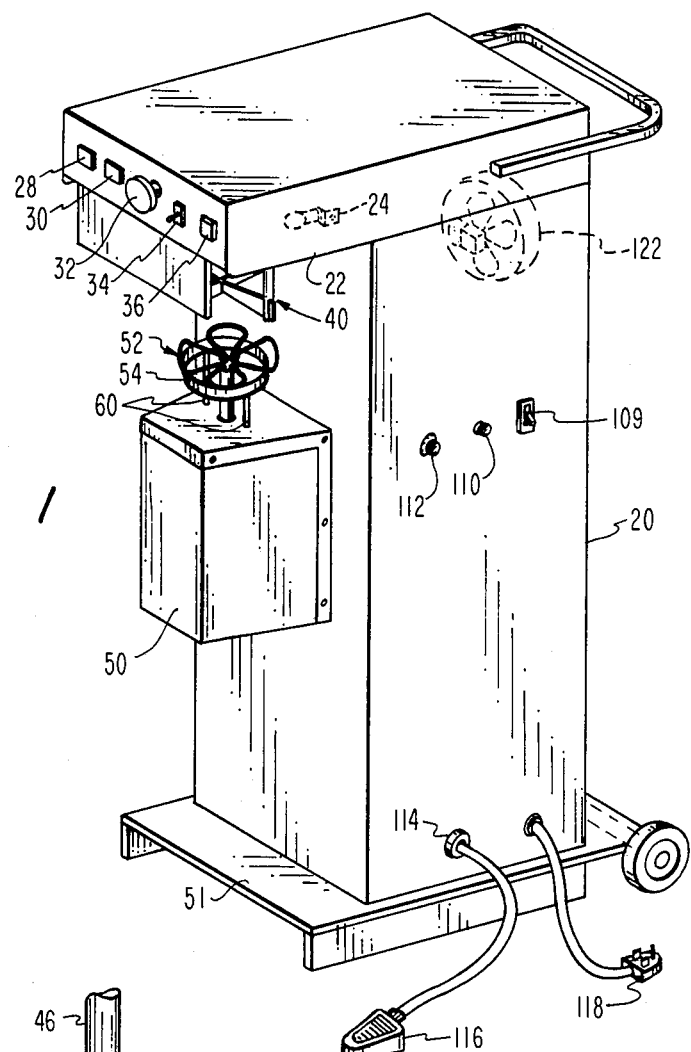
FIG. 1 is an isometric view of a tuber cutter.
Figure 2:
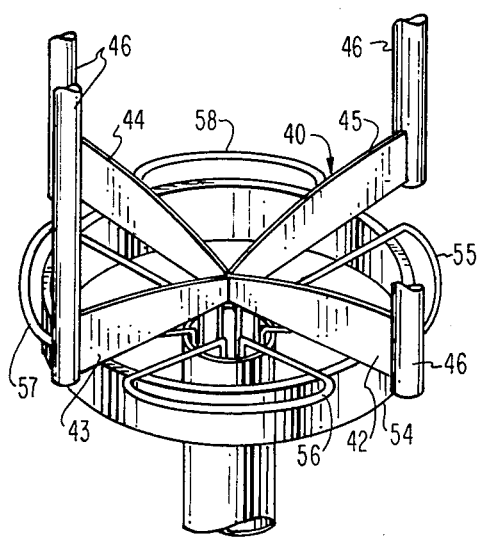
FIG. 2 is an enlarged view of certain components shown in FIG. 1 but in different relative position.

In the illustrated specific embodiment of the present invention, the aseptic tuber cutter is mounted in and on a cabinet 20. On the upper end of cabinet 20, a hood 22 projects laterally to one side in order to define a cover for a working area. For illuminating that area, one or more lamps 24 are secured within the open bottom of hood 22. Displayed outwardly on the front-most surface of hood 22 is a purge heat indicator light 28, a power-on indicator light 30, an interruptor switch 32, a carrier sanitizing switch 34 and a sanitizing indicator light 36. Interrupter switch 32 preferably has a rather large button, as shown. This is a safety feature to protect the operator and it also enables the operator to stop operation immediately when he spots a possibly diseased tuber. With the illustrated arrangement, he could even do that by placing his forehead against that switch operator. When switch 32 is actuated, everything shuts down but compressor 100 and fan 122. Compressor 100 will be described below. It suffices to say that it includes a suitable control circuit based upon the pressure to be maintained within air tank 102.

Located on the underside of hood 22 is a substrate 38 constructed of an electrically insulating material. Suspended from and beneath substrate 38 is a knife assembly 40 which in this case is composed of a plurality of four knife blades 42, 43, 44 and 45 individually formed out of an electrically resistive thin strip of metal. Blades 42-45 are commonly joined electrically and mechanically at their inner ends and are mechanically supported and electrically connected by a corresponding plurality of posts 46 from which connecting terminals 48 project from the upper surface of substrate 38. Preferably, blades 42-45 are more narrow, in the vertical direction, toward the center. This enables them to reach a higher temperature toward the center of the assembly when electric current is conducted through them.

Spaced below hood 22 is a housing 50 located generally at a height above a base 51 as to have its side walls straddled by an operator seated in front of housing 50. For the accommodation of the operator's knees, the opposing side walls of housing 50 preferably diverge slightly toward one another in the outward direction.

Projecting upwardly from housing 50 is a carrier 52 supported by a platform 54 formed of electrically insulative material. More particularly, carrier 52 is composed of a circumferentially spaced series of electrically conductive segments 55, 56, 57 and 58. A first pair of successive segments 55 and 56 are electrically connected in series as is the second pair of those composed of segments 58 and 59. Those two pairs, in turn, are electrically connected in parallel across a spaced pair of electrically conductive carrier rods 60 and 61 which have respective electrical terminals on their corresponding lower ends.

Substrate 54 is secured atop the shaft 62 of an hydraulically-operated lift cylinder 64. Extension or retraction of shaft 62 raises or lowers carrier 52 toward and away from knife assembly 40. Segments 55-58 are individually spaced apart so as to permit knife blades 42-45 to nest downwardly within the respective segments as carrier 52 reaches its uppermost position during operation. That is, the arrangement of the array of segments is such as to match the orientation of the knife blades. Of course, the total number of individual knife blades may be varied.

Located within the upper interior of cabinet 20 is a power transformer 66 from which a plurality of electrically conductive leads 68 are connected with the corresponding different ones of terminals 48. Transformer 66 is constructed in accordance with well known principles utilized for transformers intended for use in electric arc welders. Thus, transformer 66 is capable of developing high currents of, for example, between 300 and 600 amperes at voltages appearing between different connecting terminals of between approximately one and three volts, although the latter may be higher.

Carried on a support 70 within cabinet 20 is an hydraulic drive cylinder 72. On the outer end of its plunger or shaft 74 is a cross arm 76 from which drive rods 78 and 80 project rearwardly. Disposed above rods 78 and 80 are respective switches 82 and 84. Adjustably positionable on rods 78 and 80 are corresponding trigger blocks 86 and 88 which, during operation of drive cylinder 72, are movable into actuating contact with the actuators on respective ones of switches 82 and 84.

Projecting out of the upper surface of housing 50, to the side of carrier 52, is a carrier height control 90 threadably mounted into a support assembly 92 located within housing 50 and which carries a switch 94. A rod 96 depends downwardly from substrate 54 into the interior of housing 50. Adjustably positionable along the length of rod 96 is a trigger disc 98 disposed in line with the actuator on switch 94, so as to operate the latter when carrier 52 is elevated to its uppermost position as determined in height by rotational adjustment of control 90.

Figure 3:
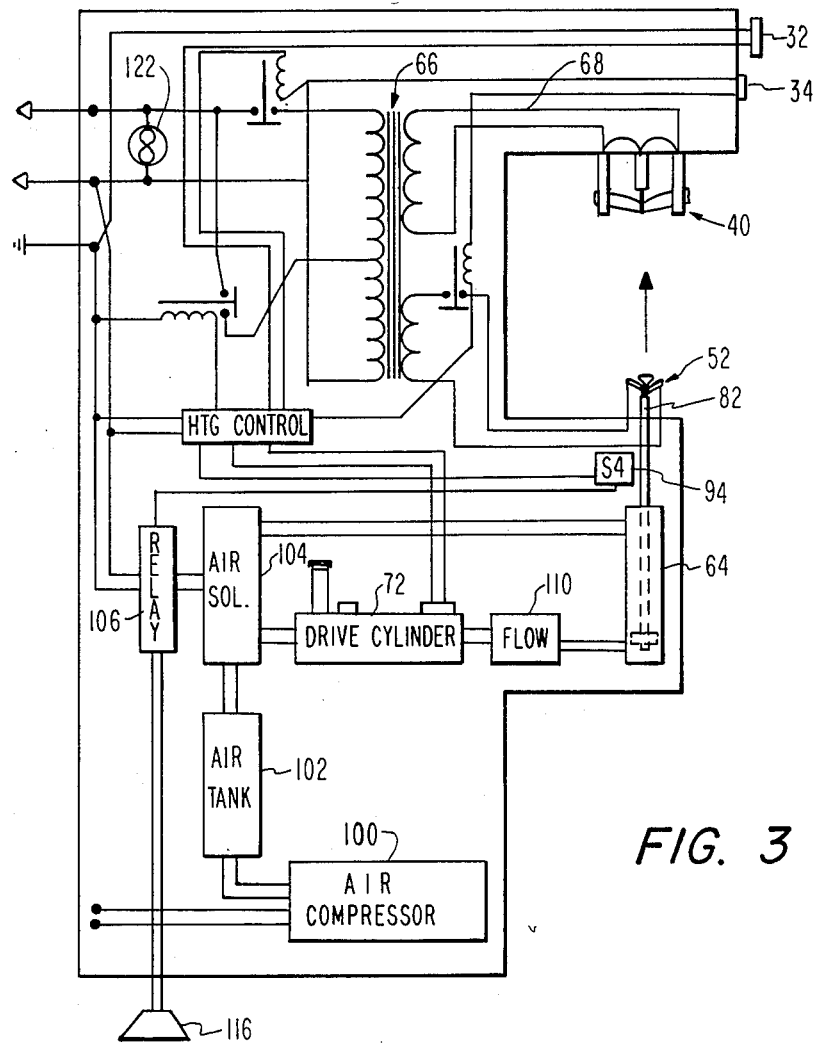
FIG. 3 is a schematic diagram showing the interrelationship of various components.
Figure 4:
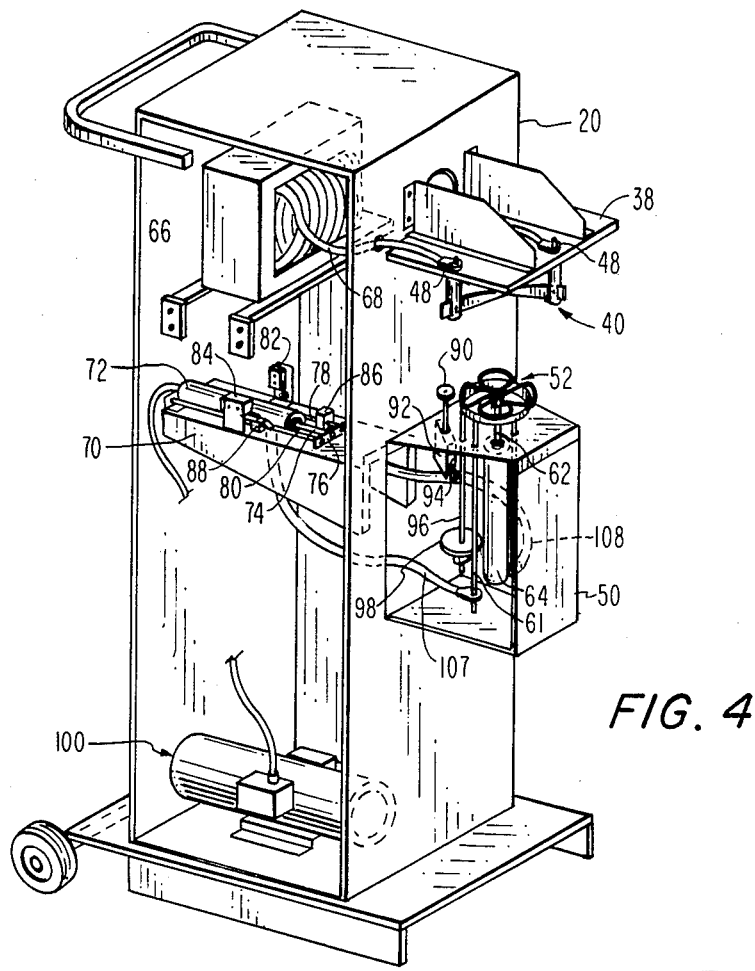
FIG. 4 is an isometric view similar to FIG. 1 but taken from opposite side and having different panels removed to reveal interior components.

Also located within cabinet 20 is an air compressor 100. As shown in FIG. 3, compressor 100 feeds a storage air tank 102 from which air is fed to a solenoid 104 under control of a relay 106 as well as other appropriate signals to depict the operation of drive cylinder 72 or lift cylinder 64, all that being very conventional in itself. An instrument panel sub-assembly (not shown) carries several different components in the nature of valves for controlling the development of pressure within cylinders 64 and 72 as well as the relaxation of that pressure to permit the respective plungers to return to a retracted position. As such, hydraulic control, valving and venting of this nature is quite conventional and very well known. In addition, that sub-assembly includes power-handling relays capable of controlling high levels of current flow in response to low-current circuits in which the several different switches already mentioned are incorporated. Additionally connected into main transformer 66 are a pair of electrically conductive leads 107 and 108 for the purpose of delivering a low voltage, moderately-high-level current through carrier segments 55-58.

Projecting through the right side wall of cabinet 20 is an input line switch 109, a flow control valve 110 and a timer control knob 112 that is adjustable to control the duration of the time interval during which knife blades 42-45 are maintained at the highest temperature level during operation. Control valve 110 is adjustably operable to control the rate at which carrier 52 is moved toward blades 42-45. As indicated, the instrument assembly includes control valves for the hydraulic system all of which operate in accordance with conventional hydraulic system approach. Also included within the instruments are various power relays for the high-current circuits under the control of the several different switches noted. Such high-current control by the operation of low-current switching and actuation is in itself very conventional and well known.

Externally exposed on cabinet 20 is also a receptacle 114 for enabling the connection of a foot switch 116 which preferably is the only operating control for causing movement of carrier 52 and the related heating yet to be described. At times other than during operation, foot switch 116 may be disconnected and stored elsewhere in order to prohibit unauthorized operation. There is, in this case, also an input power plug 118 externally available for connection elsewhere. To accommodate the heat developed within cabinet 20 by the high currents involved, the rear cabinet wall includes a screened vent and an exhaust fan 122 which delivers air outwardly through a screened outlet.

At all times during operation, blades 42-45 are maintained at a temperature level above 230° F. and preferably in a range between 300° and 500° F. That temperature level is sufficient to destroy disease pathogens such as bacteria, fungi and viruses. During the time when cutting of the tuber is actually occurring, the temperature of blades 42-45 is elevated to approximately 1500° F. or at least within a range between 1000° and 1800° F.

That high temperature level offsets what otherwise would be the cooling effect of moisture within the tuber, ensuring that blade temperature is always well above 230° F. In addition, the preferred temperature range is sufficient to clear or burn off tissue residue, such as starch which otherwise tends to accumulate on cutting blades. Moreover, the high temperature level selected ensures heat transfer through any tissue thickness that may attach to the blade as a cut is being made.

Valve control 110 enables the rate of carrier travel to be adjusted. When properly set in relationship to the high temperature interval established by timer 112, uniform cauterization occurs through the entire cut of the tuber.

The height adjustment afforded by control 90 enables control of carrier travel distance through the tuber. That is, the tuber may be cut entirely apart or, as is sometimes desired for either subsequent handling or actual planting, the individual cuts may be only almost but not all of the way through the tuber so as to leave a hinge between each cut.

Hydraulic switching and lift movement has herein been incorporated for reasons of economy, reliability and ease of accurate control. Nevertheless, other actuators, either electrical, mechanical or in combination may be employed in the alternative.

The high temperature cleaning of the blades actually carbonizes any tissue residue. The degree of actual carbon remaining on a cut surface is not harmful. In addition, the cauterization obtained forms what amounts to a scab which tightly seals the cut surface from being affected by even trace amounts of pathogens such as might be carried in the air.

The high temperature cycle of the heating of the knife assemblies is caused to occur automatically during the upward movement of carrier 52. The timer automatically turns the purging heat level to an off condition after a selected time frame has expired. Indicator light 28 indicates when the high purging heat level is occurring, while indicator light 30 indicates that the overall power is turned on and that the knife blades are being heated at the lower level so that those blades are hot. Switch 34 is actuated to effect the heating of carrier segments 55-58 to a level again at least above 230° F. and preferably, for more certainty of disease killing throughout the extent of all segments, to a level above 500° F. Such sanitizing is under the control of switch 34 which is turned to an "on" condition as signalled by indicator light 36 at any time a cut tuber appears to be even remotely possibly diseased. In addition, it is recommended that the operator sanitizes carrier 52 at regular intervals such as every hour, every sack or the like.

In use, the tubers to be cut are placed or moved to a position handy for easy and quick access by the operator. An entirely separate container system, also conveniently located with respect to the operator, is employed for the cut seed pieces. In practice, the purge timer, under control of knob 112, is adjusted to cause the high heat condition to continue through the entire actual cut plus an additional one to two seconds, in order to allow the blade heat to clear the blades of moisture, tissue and pathogens. It is preferred not to set the timer for any significantly longer period, so that, in practice, the blades do not exhibit a visual heating effect above medium red. Additional heating of the blades adds nothing to effectiveness and may be detrimental by shortening blade life.

Uniform cauterization improves the suberized layer and enhances the healing of the surface of the cut tuber. As indicated above, for any given cultivator of potato with a given average moisture content, uniform cauterization is obtained across the cut by careful adjustment of the purge heat timer 112 together with the carrier speed control 110.

Notwithstanding the aseptic operation of the disclosed cutter apparatus in and of itself, additional aseptic procedures should be followed. The operator is provided with a quantity of disposable plastic gloves. Prior to operation, the operator's hands and all exposed surfaces on the machine preferably are chemically disinfected, after which the gloves are placed on the operator's hands just prior to operation.

When the operator discovers that he or she has handled a tuber which is even suspected of being diseased, the operator should avoid touching any part of the machine or its controls; should that have occurred, routine chemical disinfecting procedure should be followed. In addition, the suspected tuber and the gloves which handled it ought to be disposed of immediately into a suitable controlled container. Further effort should be made to clean and sanitize any surfaces that may have received juice drip from the suspected tuber. Thereafter, the carrier sanitizing switch should be actuated while a new pair of disposable gloves are placed over the hands.

Of course, attention should also be directed to overall work area procedures if not already being used prior to installation of the apparatus. Caution should be taken to eliminate any diseased pathogens from bypassing the asceptic cutting process. To this end, it is desired to locate the tuber cutter so that there is distinct separation between incoming tubers and outgoing seed pieces. In addition, sacks, cartons, trays, conveyors and so forth for incoming tubers should be entirely separate from apparatus of that sort which is used to handle the cut seed pieces. The cut seed pieces should be placed only in disinfected containers.

Figure 5B:
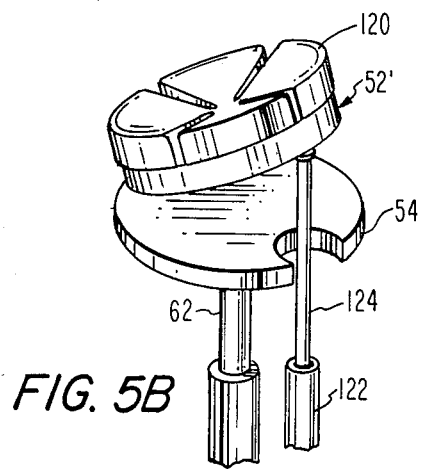
FIG. 5B is another isometric view of that subassembly with components differently positioned.
Figure 5A:
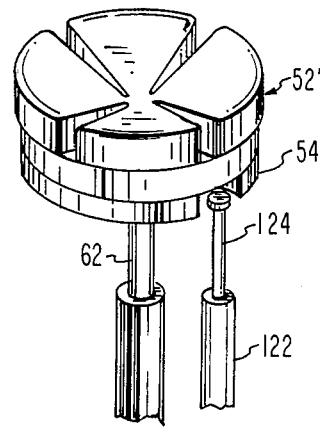
FIG. 5A is an isometric view of an alternative component subassembly.

An alternative carrier assembly 52' is shown in FIGS. 5a and 5b. In this case, carrier 120 is divided into four corresponding segments and is easily removable for conventional steam or chemical disinfecting. It presents a smooth upper surface that tapers downwardly toward the middle or center. Carrier 120 may be of any of a variety of shapes to accommodate different tuber species of various sizes and shapes. As specifically shown, it also allows for simple cutting of four small tubers. Similarly, carrier segments 55-58 of the embodiment described earlier could be also caused to so taper and thereby form sort of a cradle to better hold and center a tuber during the cutting operation.

At the same time, another lift cylinder 122 is included within lower housing 50 and has a plunger 124 which extends upwardly in order to cause carrier 120, to tilt to one side for automatically unloading the seed pieces. With such an arrangement permitting automatic unloading of the cut seed pieces, it would now be rather conventional to further include the operation of a robot arm with an end effector that would actually grab a tuber and load it onto the platform or onto the carrier. Of course, that is a mere adaptation to what may be essentially complete automation other than for continuous inspection to detect the existance of a possibly diseased tuber.

It will be appreciated by a person of ordinary skill in the art that various changes and modifications may be made in the specific embodiment and alternatives and that equivalent alternatives may be employed. It is the aim in the appended claims to cover all such variations as fall within the scope and spirit of that which is patentable.

I claim:

1. An aseptic tuber cutter comprising:
    a carrier for supporting a tuber to be cut;
    an assembly including a knife blade for cutting said tuber;
    means for moving said carrier relatively toward said assembly;
    means for maintaining said blade throughout operation at a temperature sufficiently elevated to destroy pathogens;
    and means for further elevating said temperature during cutting of said tuber by said blade to a level sufficient to offset cooling of said blade by reason of moisture in said tuber and to carbonize tissue residue from said tuber and thereby enable said blade to remain free of said residue.

2. An aseptic tuber cutter as defined in claim 1 which further includes means selectively operable to elevate the temperature of said carrier to a level sufficient to sanitize said carrier.

3. An aseptic tuber cutter as defined in claim 1 in which said temperature is elevated by the conduction of electric current through said blade.

4. An aseptic tuber cutter as defined in claim 1 in which said temperature is maintained throughout operation at a level above 230° F. and during said cutting at a level above 1000° F.

5. An aseptic tuber cutter as defined in claim 1 which includes means for adjusting the rate of movement of said carrier relative to said assembly in order to control uniformity of cauterization of said tuber by said blade.

6. An aseptic tuber cutter as defined in claim 1 which includes means for varying the distance of movement of said carrier relative to said blade assembly.

7. An aseptic tuber cutter as defined in claim 1 in which said assembly includes a plurality of knife blades arranged in a selected pattern.

8. An aseptic tuber cutter as defined in claim 7 in which said carrier includes a plurality of support segments which define an array oriented to permit entry of said blades between different ones of said segments upon approach of said carrier relative to said assembly.

9. An aseptic tuber cutter as defined in claim 1 in which includes means for adjusting the length of the time interval during which said temperature is further elevated relative to the speed of movement of said carrier relative to said assembly.

* * * * *